Sept. 16, 1958
C. D. COCKBURN
2,852,672
AUTOMATIC GAIN AND NOISE LIMITING CIRCUIT
FOR A RADAR RANGE UNIT
Filed Aug. 31, 1953
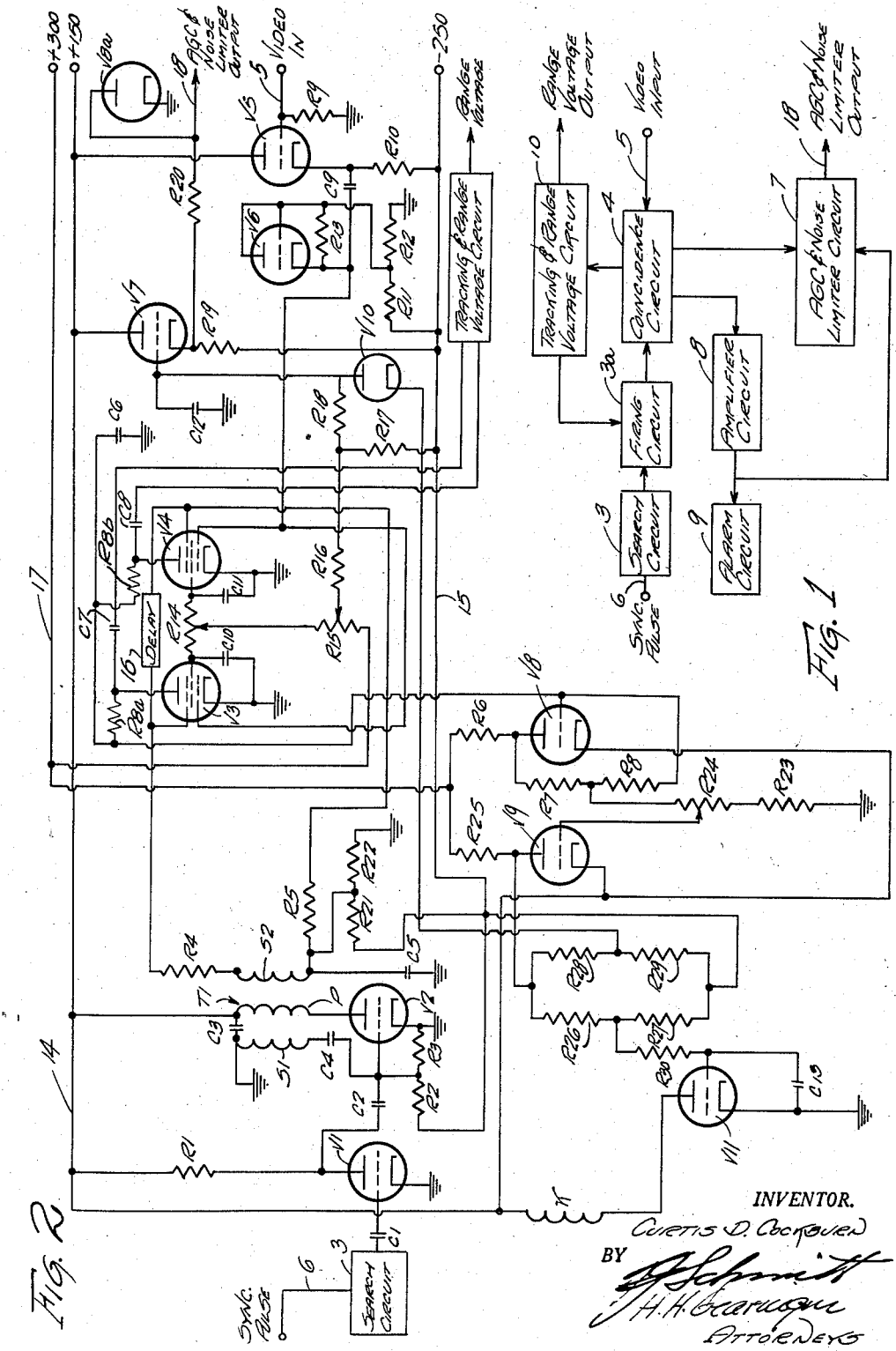
INVENTOR.
CURTIS D. COCKBURN
BY
*J. Schmitt*
*J. H. Garrigus*
ATTORNEYS

United States Patent Office 2,852,672
Patented Sept. 16, 1958

2,852,672

AUTOMATIC GAIN AND NOISE LIMITING CIRCUIT FOR A RADAR RANGE UNIT

Curtis D. Cockburn, Baldwinsville, N. Y., assignor, by mesne assignments, to the United States of America as represented by the Secretary of the Navy Application August 31, 1953, Serial No. 377,750

2 Claims. (Cl. 250—27)

The invention described herein may be manufactured by or for the Government of the United States of America for governmental purposes without the payment of any royalties thereon or therefor.

The present invention relates to apparatus for automatically controlling the response of an electromagnetic sensitive device or the like and more particularly to novel and improved automatic gain control and noise limiter circuits which are specially designed for use in an electronic radar range unit.

In the usual conventional type of radar range unit it is ordinarily necessary and desirable to control the gain and/or the sensitivity of the radar receiver with which the range unit is associated so that the output thereof will remain substantially constant even though the incoming target and noise signals may vary appreciably in strength and/or intensity. Although a number of relatively complex systems and circuits have been designed in the past to accomplish the above mentioned desired end, considerable difficulty has been experienced in devising a circuit which though relatively simple in design is sufficiently reliable and dependable for such a purpose.

It is a principal object of the present invention to provide a novel and improved automatic gain control and noise limiter circuit for a radar range unit, which circuit is relatively simple in design and is adapted to properly stabilize and/or regulate the output of an associated radar receiver despite irregularities and discontinuities in the strength and amplitude of the incoming signals.

Other objects and many of the attendant advantages of this invention will be readily appreciated as the same becomes better understood by reference to the following detailed description when considered in connection with the accompanying drawings wherein:

Figure 1 is a block diagram of a conventional type of radar range unit in which a preferred embodiment of the present invention is incorporated.

Figure 2 is a detailed circuit diagram of the apparatus shown in Figure 1.

Before proceeding with a more detailed description of the improved control circuits of the present invention a brief functional explanation of the same as well as the manner in which they are operatively associated with other component parts of the disclosed radar range unit will be given in order to aid in a complete understanding of the detailed description that is to follow. The radar range unit with which the subject matter of the present invention is preferably incorporated is generally capable of performing two important operations. First, it searches out a particular target that is located in a given target area; then, it automatically tracks that target so as to continuously provide a voltage, the magnitude of which accurately describes the target range.

Until a suitable target has been encountered the search circuit which is normally energized and which is generally designated in Figure 1 of the drawing by reference numeral 3 together with firing circuit 3a causes the effective range, at which the coincidence circuit 4 is "gated" (i. e. conditioned for energization by incoming video signals on the input line 5) to increase and/or progress relatively slowly and linearly outwardly with each successive synchronizing pulse on line 6 until a preselected maximum range is reached. At that instant the effective range at which the coincidence circuit is then "gated" abruptly returns to a preselected minimum range to repeat the outward searching process. This searching operation continues until a target is encountered. Moreover, until that time as will be described more fully hereinafter the AGC and noise limiter circuits 7 are proportionately controlled largely by the amplitude or strength of the noise signals that continuously excite the video input line.

When in the course of the above described outward search a target is encountered, and when the coincidence circuit 4 has been properly "gated" by the firing circuit 3a, the resultant effect on the coincidence circuit is conducted through the amplifier circuit 8 to the alarm circuit 9, which in turn causes an immediate energization of the tracking and range voltage circuits 10. During the subsequent tracking operation the nature and amplitude of the desired AGC and noise limiter control voltage is substantially determined by and proportional to the amplitude of the incoming target signals on the video input line 5 in a manner which will also be described more fully hereinafter.

At the outset it is to be understood that although the subject matter of the present invention has been particularly devised for use with and in conjunction with the component parts of a conventional radar range unit, the same could also be used in connection with any other suitable electronic equipment without departing from the spirit or scope of the present invention. Moreover, in this connection since the specific structure and nature of such components of the radar range unit as the search circuit 3 and the tracking and range voltage circuits 10 may take a large variety of different forms and since the details thereof form no important part of the present invention a full description of the same is omitted for the sake of simplicity.

A detailed circuit diagram of a preferred embodiment of the present invention is shown in Figure 2 of the drawing. As illustrated therein, the search circuit which is generally designated by reference numeral 3 is coupled to the grid of the triode amplifier V–1 through the condenser C–1. The plate circuit of triode V–1 extends from the positive 150 volt line 14 through the resistor R–1 and the tube to ground. The plate of V–1 is connected to the grid of the conventional single-swing blocking oscillator V–2 of the firing circuit 3a through the condenser C–2. The plate circuit of the blocking oscillator extends from the positive 150 volt line 14 through the primary winding P of the coupling transformer T–1 and the tube to ground. The series plate to grid feedback circuit of the oscillator V–2 includes the secondary winding S–1 of transformer T–1 and the condensers C–3 and C–4. The junction of the winding S–1 and condenser C–3 is preferably tied to ground. As will be more apparent hereinafter the resistor divider network which includes resistors R–2 and R–3 and which extends between ground and the negative 250 volt line 15 continuously provides a suitable bias for the grid of V–2.

The output circuit of the blocking oscillator V–2 includes in series the secondary winding S–2 of transformer T–1, resistor R–4, delay network 16, and resistor R–5. The junction of the winding S–2 and resistor R–5 is preferably coupled to ground through condenser C–5 and is also tied to the resistance network which extends from the negative 250 volt line 15 to ground and which includes resistors R21 and R22. As shown in the drawing the suppressor grids of the coincidence tubes V-3 and V-4 are connected directly to the output circuit of the blocking oscillator preferably adjacent opposite terminals of the delay network 16. The plate circuits of the coincidence tubes V-3 and V-4 extend from the positive 300 volt line 17 successively through resistors R-6, R-7 and R-8 respectively through resistors R-8a and R-8b and through the respective tubes to ground. The plates of tubes V-3 and V-4 which are preferably coupled to ground by means of the condenser C-6 are also respectively connected to the tracking circuit 10 through condensers C-7 and C-8.

The control grids of the coincidence tubes V-3 and V-4 are preferably tied together as shown and are coupled through condenser C-9 to the output of the cathode follower V-5 which as will be more apparent hereinafter is driven by the incoming target signals on the video input line 5. The grid resistor R-9 in the cathode follower circuit is preferably connected as shown in the drawing between the grid of V-5 and ground. The plate circuit of V-5 extends from the positive 150 volt line 14 through the tube and cathode resistor R-10 to the negative 250 volt line 15.

As is also shown in the drawing the D. C. restorer triode or clamp V-6 is preferably coupled to the input control grid circuits of the coincidence tubes V-3 and V-4 such that as will be more apparent thereinafter negative surges on the input line are substantially eliminated. Accordingly, the cathode of V-6 is tied directly the coincidence tube grid input circuit whereas its grid and plate which are preferably connected together are connected to a resistor network which extends between the negative 250 volt line 15 and ground and which includes in series resistors R-11 and R-12. The cathode of V-6 is also preferably coupled to its grid and plate through resistor R-13.

The screen grid circuits of coincidence tubes V-3 and V-4 in addition to being respectively coupled to ground by way of the by-pass condensers C-10 and C-11 are preferably connected to opposite extremities of the potentiometer R-14. The adjustable arm of potentiometer is connected as shown to the positive 300 volt line 17 through the potentiometer R-15 whereas the adjustable arm of R-15 is in turn connected to the negative 250 volt line 15 by way of the series resistors R-16 and R-17. The junction of resistors R-16 and R-17 is coupled through resistor R-18 to the grid of the cathode follower V-7 which is also preferably connected to ground by way of condenser C-12.

The plate circuit of V-7 extends from the positive 150 volt line 14 through the tube and cathode resistor R-19 to the negative 250 volt line 15. The output circuit of cathode follower V-7 preferably extends through resistor R-20 to a suitable radar receiver or other associated equipment which though not shown on the drawing is to be controlled in accordance with the present invention. As shown in the drawing the above described output circuit is also preferably tied to ground by the diode clamp or the like V-8a.

The output circuits of the coincidence tubes V-3 and V-4 are connected to the grid of the direct coupled amplifier V-8 so as to drive the same in accordance with variations in voltage potential at the plates of V-3 and V-4. The plate circuit of V-8 extends from the positive 300 volt line 17 through resistor R-6 and the tube to the positive 150 volt line 14. As shown in the drawing the plate of triode V-8 is operatively coupled to the grid of D. C. amplifier V-9 by means of the series circuit to ground, which circuit includes resistors R-7 and R-23 and potentiometer R-24. The plate circuit of V-9 which extends from the positive 300 volt line 17 through resistor R-25 and the tube to the positive 150 volt line 14, drives the series parallel resistance network which includes resistors R-26, R-27, R-28, and R-29 and which is connected between the plate of V-9 and the negative 250 volt line 15. The junction of resistors R-28 and R-29 of this network is coupled to the grid of cathode follower V-7 through the diode V-10 whereas the junction of resistors R-26 and R-27 is coupled to the grid of the alarm relay triode V-11. The grid of V-11 is also coupled to ground by way of condenser C-13 whereas its plate circuit extends from the positive 150 volt line 14 through relay winding K and the tube to ground.

In operation the incoming video target signals together with background noise signals and the like are received on the input line 5 and passed through the isolating cathode follower V-5 to the control grid circuit of the coincidence tubes V-3 and V-4. Inasmuch as the resistance of resistor R-11 in the video input clamping circuit is relatively large compared to that of resistor R-12 the grid and plate of triode V-6 is maintained at a negative potential which is preferably only slightly below ground level such that the negative surges on the input line are substantially eliminated.

During the searching operation, since no target signal is delivered to either control grid of the coincidence tubes V-3 and V-4 while the suppressor grids thereof are positively pulsed by the blocking oscillator V-2, the tubes V-3 and V-4 remain cut off so far as their plate circuits are concerned. However, despite the normal relatively high negative bias on the suppressor grids of tubes V-3 and V-4 the screen circuits thereof continuously follow the variations of voltage potential on the video input line 5. More specifically the noise signals as well as the occasional incoming target signals excite the grid circuit of each of the coincidence tubes, produce a proportionate energization of the screen circuits thereof, and accordingly drive the grid circuit of the cathode follower V-7, which as will be more apparent hereinafter provides the desired AGC and noise limiter control voltage for a suitable radar receiver or other associated equipment not shown on the drawing.

When during the searching operation a target is ultimately encountered the plate circuits of the coincidence tubes V-3 and V-4 become energized such that the potential at the plates thereof is abruptly and substantially reduced. This abrupt negatively directed excursion at the plates of the coincidence tubes V-3 and V-4 is then successively passed through the D. C. amplifier circuit 8 which includes triodes V-8 and V-9 to the associated series parallel resistance network, to which a pair of output circuits are coupled. One of these output circuits extends from the junction of the network resistors R-26 and R-27 through resistor R-30 to the grid of triode V-11 and thereby controls the energization of alarm relay K in the plate circuit of V-11. When relay K is energized in this way the tracking and range voltage circuits 10 are then immediately made operative.

The other above mentioned output circuit of the said resistance network extends from the junction of its component resistors R-28 and R-29 through diode V-10 to the grid of cathode follower V-7 where the AGC signal and noise limiter signal from the coincidence tube screen circuit are combined to provide the desired sensitivity control voltage on the output line 18 for the receiver or other suitable associated radar equipment.

Obviously many modifications and variations of the present invention are possible in the light of the above teachings. It is therefore to be understood that within the scope of the appended claims the invention may be practiced otherwise than as specifically described.

What is claimed is:

1. In a radar range unit a source of video target signals superimposed upon a background of noise; a gating circuit including a pair of coincidence tubes, each of the said tubes having a common control grid energizing circuit, a common screen grid energizing circuit, a common suppressor grid energizing circuit, and a common plate energizing circuit; means for normally maintaining a substantial negative bias upon the suppressor grid circuit and for intermittently removing the said negative bias therefrom; means for normally biasing the control grid circuit to cut-off; means for coupling the control grid circuit to the said source; a cathode follower circuit; means for driving the cathode follower circuit in accordance with the flow of current through the screen circuit; means for also driving the cathode follower circuit in accordance with the flow of current through the plate circuit; and means for obtaining an automatic gain control and noise limiter voltage from the output of the cathode follower circuit.

2. In a radar range unit a source of video target signals superimposed upon a background of noise; a gating circuit including a pair of coincidence tubes, each of the said tubes having a common control grid energizing circuit, a common screen grid energizing circuit, a common suppressor grid energizing circuit, and a common plate energizing circuit; means for normally maintaining a substantial negative bias upon the suppressor grid circuit and for intermittently removing the said negative bias therefrom; means for normally biasing the control grid circuit to cut-off; means for coupling the control grid circuit to the said source; an amplifier; means for driving the amplifier in accordance with the flow of current through the said plate circuit; a cathode follower; means for coupling the said screen circuit to the input of the cathode follower; a diode; means for coupling the output of the amplifier through the diode also to the input of the cathode follower; and means for obtaining an automatic gain control and noise limiter voltage from the output of the cathode follower.

References Cited in the file of this patent

UNITED STATES PATENTS

| | | |
|---|---|---|
| 2,241,581 | Boucke | May 13, 1941 |
| 2,451,632 | Oliver | Oct. 19, 1948 |
| 2,516,356 | Tull et al. | July 25, 1950 |
| 2,538,028 | Mozley | Jan. 16, 1951 |
| 2,563,902 | Yost | Aug. 14, 1951 |
| 2,677,050 | Crooks | Apr. 27, 1954 |
| 2,734,134 | Beard | Feb. 7, 1956 |